United States Patent
Doddaiah et al.

(10) Patent No.: US 12,346,258 B1
(45) Date of Patent: Jul. 1, 2025

(54) METADATA PAGE PREFETCH PROCESSING FOR INCOMING IO OPERATIONS

(71) Applicant: Dell Products, L.P., Hopkinton, MA (US)

(72) Inventors: Ramesh Doddaiah, Westborough, MA (US); Sandeep Chandrashekhara, Shrewsbury, MA (US); Mohammed Aamir Vt, Bangalore (IN); Mohammed Asher, Bangalore (IN)

(73) Assignee: Dell Products, L.P., Hopkinton, MA (US)

( * ) Notice: Subject to any disclaimer, the term of this patent is extended or adjusted under 35 U.S.C. 154(b) by 0 days.

(21) Appl. No.: 18/401,643

(22) Filed: Jan. 1, 2024

(51) Int. Cl.
 *G06F 12/0862* (2016.01)

(52) U.S. Cl.
 CPC .... *G06F 12/0862* (2013.01); *G06F 2212/602* (2013.01)

(58) Field of Classification Search
 CPC ............. G06F 12/0862; G06F 2212/602
 USPC ............................................. 711/118
 See application file for complete search history.

(56) References Cited

U.S. PATENT DOCUMENTS

| | | | | |
|---|---|---|---|---|
| 7,496,642 | B2* | 2/2009 | Gill | G06F 16/9574 709/219 |
| 9,934,147 | B1* | 4/2018 | Bent | G06F 12/08 |
| 10,871,966 | B2* | 12/2020 | Chen | G06F 9/3867 |
| 11,010,251 | B1* | 5/2021 | Soukhman | G06F 11/1451 |
| 11,520,527 | B1* | 12/2022 | Alkalay | G06F 3/0631 |
| 11,816,103 | B1* | 11/2023 | Goel | G06F 16/24552 |
| 2005/0027941 | A1* | 2/2005 | Wang | G06F 9/3851 712/E9.05 |
| 2006/0224860 | A1* | 10/2006 | Colavin | G06F 9/383 711/213 |
| 2018/0300845 | A1* | 10/2018 | Lake | G06T 1/20 |
| 2020/0026653 | A1* | 1/2020 | Shveidel | G06F 12/0868 |
| 2020/0034298 | A1* | 1/2020 | Benisty | G06F 12/0873 |
| 2020/0241791 | A1* | 7/2020 | Thomsen | G06F 9/5016 |
| 2021/0124657 | A1* | 4/2021 | Kamran | G06F 9/547 |
| 2021/0248124 | A1* | 8/2021 | Tobin | G06F 12/0882 |
| 2022/0318151 | A1* | 10/2022 | Kotra | G06F 3/0679 |
| 2024/0411697 | A1* | 12/2024 | Wang | G06F 12/0862 |

\* cited by examiner

*Primary Examiner* — Reginald G Bragdon
*Assistant Examiner* — Aaron D Ho
(74) *Attorney, Agent, or Firm* — Anderson Gorecki LLP

(57) ABSTRACT

Metadata page prefetch processing for incoming IO operations is provided to increase storage system performance by reducing the frequency of metadata page miss events during IO processing. When an IO is received at a storage system, the IO is placed in an IO queue to be scheduled for processing by an IO processing thread. A metadata page prefetch thread reads the LBA address of the IO and determines whether all of the metadata page(s) that will be needed by the IO processing thread are contained in IO thread metadata resources. In response to a determination that one or more of the required metadata pages are not contained in IO thread metadata resources, the metadata page prefetch thread instructs a MDP thread to move the required metadata page(s) from metadata storage to IO thread metadata resources. The IO processing thread then implements the IO operation using the prefetched metadata.

10 Claims, 11 Drawing Sheets

Write to snapshot

Write to snapshot

Read on target linked to snapshot

Read on target linked to snapshot

METADATA PAGE PREFETCH PROCESSING FOR INCOMING IO OPERATIONS

FIELD

This disclosure relates to computing systems and related devices and methods, and, more particularly, to metadata page prefetch processing for incoming IO operations to increase storage system IO performance.

SUMMARY

The following Summary and the Abstract set forth at the end of this document are provided herein to introduce some concepts discussed in the Detailed Description below. The Summary and Abstract sections are not comprehensive and are not intended to delineate the scope of protectable subject matter, which is set forth by the claims presented below.

All examples and features mentioned below can be combined in any technically possible way.

In some embodiments, a method and apparatus for metadata page prefetch processing for incoming IO operations is provided, to increase storage system IO performance by reducing the occurrence of metadata page miss events during IO processing.

In some embodiments, when an IO is received at a storage system, the IO is placed in a queue, such as a fibre channel/common driver interface (FC/CDI) queue, to be scheduled for processing by an IO processing thread (the IO processing thread is also referred to herein as the "IO thread" or the "IO worker thread"). A metadata page prefetch thread reads the LBA address of the IO that has been placed in the queue asynchronously from the IO thread, and determines whether all of the metadata page(s) that will be needed by the IO thread are contained in IO thread metadata resources. "Asynchronously," as that term is used herein, is used to refer to two processes that operate independently and not in a coordinated manner. IO thread metadata resources (also referred to simply as "metadata resources"), as that term is used herein, is a temporary storage area used by the IO processing thread to hold metadata pages required by the IO processing thread when implementing IO operations on the storage system. Metadata pages are moved into and out of metadata resources by a MetaData Page (MDP) thread to make the metadata pages available to the IO processing thread.

When the metadata page prefetch thread reads the LBA address of the IO in the queue, the metadata page prefetch thread determines whether the required metadata pages are currently loaded to IO thread metadata resources. In response to a determination that one or more of the required metadata pages are not contained in IO thread metadata resources, the metadata page prefetch thread instructs the MetaData Page (MDP) thread to move the required metadata page(s) from metadata storage, such as flash, to IO thread metadata resources.

When the IO is dequeued from the queue to the IO processing thread, the IO processing thread attempts to access any required metadata page(s) from IO thread metadata resources. Since the metadata page prefetch thread operates asynchronously from the IO processing thread, and does not need to wait for the IO to be dequeued prior to instructing the MDP thread to move the required metadata page(s) from flash to IO thread metadata resources, it is possible to reduce the number of metadata page misses experienced by the IO processing thread. This increases performance of the storage system, particularly in connection with metadata intensive IO operations such as write IOs to snapshot volumes and read/write IOs to a target device that is linked to a snapshot.

In some embodiments, a method of metadata page prefetch processing for incoming IO operations, includes receiving an IO operation, and placing the IO operation in an IO queue. The method also includes determining, by a metadata page prefetch thread, that a metadata page required by an IO processing thread to implementing the IO operation is not contained in IO thread metadata resources, and instructing a MetaData Page (MDP) thread, by the metadata page prefetch thread, to page-in the required metadata page to the IO thread metadata resources. The method also includes, after implementing the page-in process to load the metadata page to the IO thread metadata resources, selecting the IO operation from the IO queue by the IO processing thread to be implemented by the IO processing thread, and accessing the metadata page, by the IO processing thread, from the IO thread metadata resources in connection with implementing the IO operation by the IO processing thread.

In some embodiments, the IO processing thread, the MDP thread, and the metadata page prefetch thread are three separate and independent processing threads. In some embodiments, the IO processing thread and metadata page prefetch thread are asynchronous. In some embodiments, the MDP thread executes to move metadata pages to the IO thread metadata resources in response to instructions from the IO processing thread and in response to instructions from the metadata page prefetch thread.

In some embodiments, determining, by the metadata page prefetch thread, that the metadata page required by the IO processing thread to implementing the IO operation is not contained in IO thread metadata resources includes reading a Logical Block Address of the IO operation while the IO operation is contained in the IO queue, and querying the IO thread metadata resources for a metadata page including metadata for the LBA of the IO operation. In some embodiments, querying the IO thread metadata resources for the metadata page includes querying the IO thread metadata resources for all metadata pages required by the IO processing thread to implement the IO operation.

In some embodiments, the method further includes paging-in the required metadata page by the MDP thread from metadata storage to the IO thread metadata resources. In some embodiments, metadata storage is implemented using a persistent memory technology, and IO thread metadata resources is implemented using a dynamic memory technology that has a shorter response time than the persistent memory technology.

In some embodiments, the method further includes implementing the page-in process, accessing the metadata page by the metadata page prefetch thread, from the IO thread metadata resources, to identify subsequent metadata pages required by the IO processing thread in connection with implementing the IO operation, and instructing the MetaData Page (MDP) thread, by the metadata page prefetch thread, to page-in the subsequent metadata pages to the IO thread metadata resources.

In some embodiments, a storage system includes one or more processors and one or more storage devices storing instructions that are operable, when executed by the one or more processors, to cause the one or more processors to perform operations including receiving an IO operation, and placing the IO operation in an IO queue. The operations further include determining, by a metadata page prefetch thread, that a metadata page required by an IO processing thread to implementing the IO operation is not contained in IO thread metadata resources, and instructing a MetaData Page (MDP) thread, by the metadata page prefetch thread, to page-in the required metadata page to the IO thread metadata resources. The operations further include after implementing the page-in process to load the metadata page to the IO thread metadata resources, selecting the IO operation from the IO queue by the IO processing thread to be implemented by the IO processing thread, and accessing the metadata page, by the IO processing thread, from the IO thread metadata resources in connection with implementing the IO operation by the IO processing thread.

In some embodiments, the IO processing thread, the MDP thread, and the metadata page prefetch thread are three separate and independent processing threads. In some embodiments, the IO processing thread and metadata page prefetch thread are asynchronous. In some embodiments, the MDP thread executes to move metadata pages to the IO thread metadata resources in response to instructions from the IO processing thread and in response to instructions from the metadata page prefetch thread.

In some embodiments, determining, by the metadata page prefetch thread, that the metadata page required by the IO processing thread to implementing the IO operation is not contained in IO thread metadata resources includes reading a Logical Block Address of the IO operation while the IO operation is contained in the IO queue, and querying the IO thread metadata resources for a metadata page including metadata for the LBA of the IO operation. In some embodiments, querying the IO thread metadata resources for the metadata page includes querying the IO thread metadata resources for all metadata pages required by the IO processing thread to implement the IO operation.

In some embodiments, the operations further include paging-in the required metadata page by the MDP thread from metadata storage to the IO thread metadata resources. In some embodiments, metadata storage is implemented using a persistent memory technology, and IO thread metadata resources is implemented using a dynamic memory technology that has a shorter response time than the persistent memory technology.

In some embodiments, the operations further include after implementing the page-in process, accessing the metadata page by the metadata page prefetch thread, from the IO thread metadata resources, to identify subsequent metadata pages required by the IO processing thread in connection with implementing the IO operation, and instructing the MetaData Page (MDP) thread, by the metadata page prefetch thread, to page-in the subsequent metadata pages to the IO thread metadata resources.

DETAILED DESCRIPTION

Aspects of the inventive concepts will be described as being implemented in a storage system 100 connected to a host computer 102. Such implementations should not be viewed as limiting. Those of ordinary skill in the art will recognize that there are a wide variety of implementations of the inventive concepts in view of the teachings of the present disclosure.

Some aspects, features and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory tangible computer-readable medium. Furthermore, it will be understood by those of ordinary skill in the art that the computer-executable instructions may be executed on a variety of tangible processor devices, i.e., physical hardware. For ease of exposition, not every step, device or component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g., and without limitation, abstractions of tangible features. The term "physical" is used to refer to tangible features, including but not limited to electronic hardware. For example, multiple virtual computing devices could operate simultaneously on one physical computing device. The term "logic" is used to refer to special purpose physical circuit elements, firmware, and/or software implemented by computer instructions that are stored on a non-transitory tangible computer-readable medium and implemented by multi-purpose tangible processors, and any combinations thereof.

Figure 1:
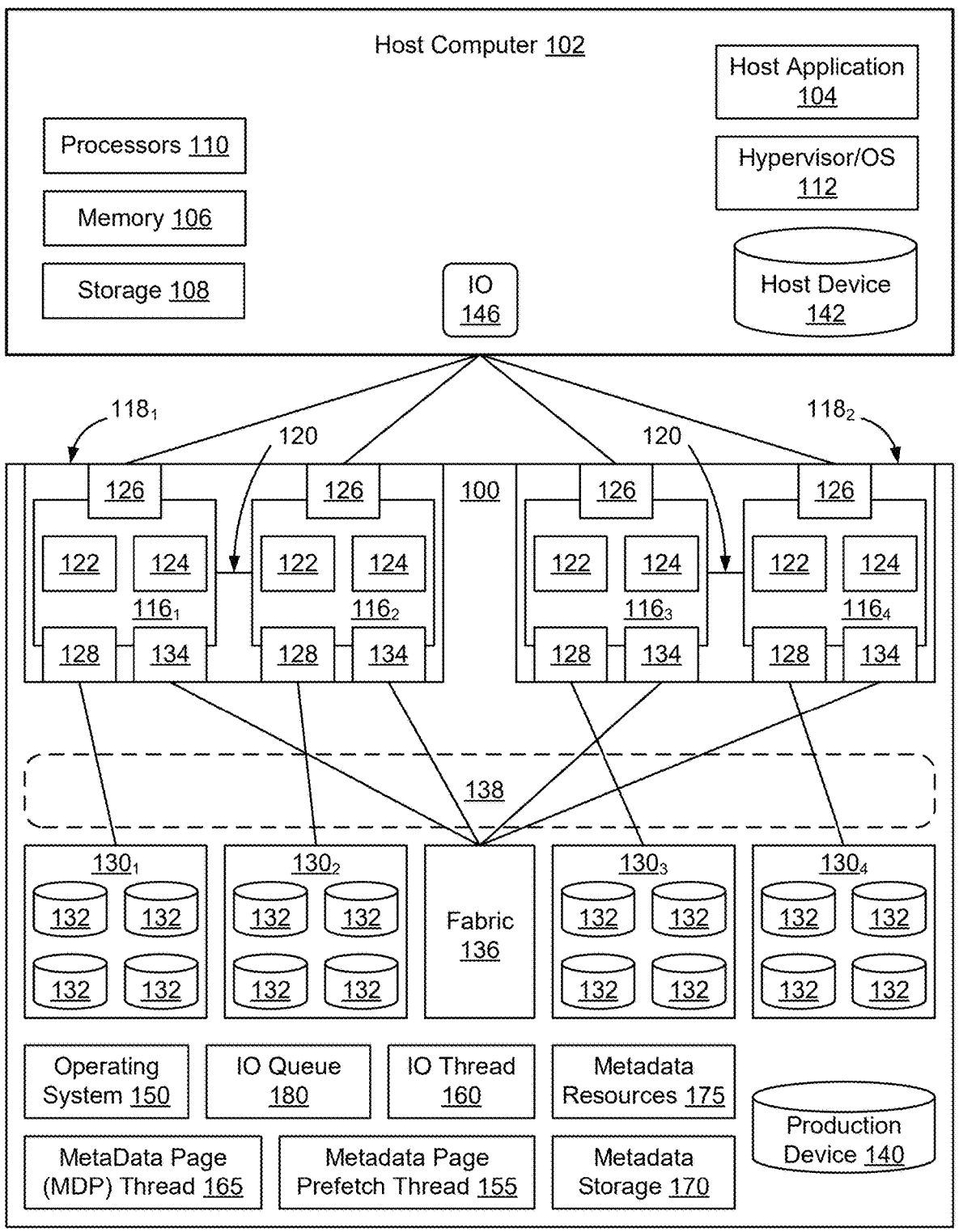
FIG. 1 is a functional block diagram of an example storage system connected to a host computer, according to some embodiments.

FIG. 1 illustrates a storage system 100 and an associated host computer 102, of which there may be many. The storage system 100 provides data storage services for a host application 104, of which there may be more than one instance and type running on the host computer 102. In the illustrated example, the host computer 102 is a server with host volatile memory 106, persistent storage 108, one or more tangible processors 110, and a hypervisor or OS (Operating System) 112. The processors 110 may include one or more multi-core processors that include multiple CPUs (Central Processing Units), GPUs (Graphics Processing Units), and combinations thereof. The host volatile memory 106 may include RAM (Random Access Memory) of any type. The persistent storage 108 may include tangible persistent storage components of one or more technology types, for example and without limitation SSDs (Solid State Drives) and HDDs (Hard Disk Drives) of any type, including but not limited to SCM (Storage Class Memory), EFDs (Enterprise Flash Drives), SATA (Serial Advanced Technology Attachment) drives, and FC (Fibre Channel) drives. The host computer 102 might support multiple virtual hosts running on virtual machines or containers. Although an external host computer 102 is illustrated in FIG. 1, in some embodiments host computer 102 may be implemented as a virtual machine within storage system 100.

The storage system 100 includes a plurality of compute nodes $116_1$-$116_4$, possibly including but not limited to storage servers and specially designed compute engines or storage directors for providing data storage services. In some embodiments, pairs of the compute nodes, e.g. ($116_1$-$116_2$) and ($116_3$-$116_4$), are organized as storage engines $118_1$ and $118_2$, respectively, for purposes of facilitating failover between compute nodes 116 within storage system 100. In some embodiments, the paired compute nodes 116 of each storage engine 118 are directly interconnected by communication links 120. In some embodiments, the communication links 120 are implemented as a PCIe NTB. As used herein, the term "storage engine" will refer to a storage engine, such as storage engines $118_1$ and $118_2$, which has a pair of (two independent) compute nodes, e.g. ($116_1$-$116_2$) or ($116_3$-$116_4$). A given storage engine 118 is implemented using a single physical enclosure and provides a logical separation between itself and other storage engines 118 of the storage system 100. A given storage system 100 may include one storage engine 118 or multiple storage engines 118.

Each compute node, $116_1$, $116_2$, $116_3$, $116_4$, includes processors 122 and a local volatile memory 124. The processors 122 may include a plurality of multi-core processors of one or more types, e.g., including multiple CPUs, GPUs, and combinations thereof. The local volatile memory 124 may include, for example and without limitation, any type of RAM. Each compute node 116 may also include one or more front-end adapters 126 for communicating with the host computer 102. Each compute node $116_1$-$116_4$ may also include one or more back-end adapters 128 for communicating with respective associated back-end drive arrays $130_1$-$130_4$, thereby enabling access to managed drives 132. A given storage system 100 may include one back-end drive array 130 or multiple back-end drive arrays 130.

In some embodiments, managed drives 132 are storage resources dedicated to providing data storage to storage system 100 or are shared between a set of storage systems 100. Managed drives 132 may be implemented using numerous types of memory technologies for example and without limitation any of the SSDs and HDDs mentioned above. In some embodiments the managed drives 132 are implemented using NVM (Non-Volatile Memory) media technologies, such as NAND-based flash, or higher-performing SCM (Storage Class Memory) media technologies such as 3D XPoint and ReRAM (Resistive RAM). Managed drives 132 may be directly connected to the compute nodes $116_1$-$116_4$, using a PCIe (Peripheral Component Interconnect Express) bus or may be connected to the compute nodes $116_1$-$116_4$, for example, by an IB (InfiniBand) bus or fabric.

In some embodiments, each compute node 116 also includes one or more channel adapters 134 for communicating with other compute nodes 116 directly or via an interconnecting fabric 136. An example interconnecting fabric 136 may be implemented using PCIe (Peripheral Component Interconnect Express) or InfiniBand. Each compute node 116 may allocate a portion or partition of its respective local volatile memory 124 to a virtual shared memory 138 that can be accessed by other compute nodes 116 over the PCIe NTB links.

The storage system 100 maintains data for the host applications 104 running on the host computer 102. For example, host application 104 may write data of host application 104 to the storage system 100 and read data of host application 104 from the storage system 100 in order to perform various functions. Examples of host applications 104 may include but are not limited to file servers, email servers, block servers, and databases.

Logical storage devices are created and presented to the host application 104 for storage of the host application 104 data. For example, as shown in FIG. 1, a production device 140 and a corresponding host device 142 are created to enable the storage system 100 to provide storage services to the host application 104.

The host device 142 is a local (to host computer 102) representation of the production device 140. Multiple host devices 142, associated with different host computers 102, may be local representations of the same production device 140. The host device 142 and the production device 140 are abstraction layers between the managed drives 132 and the host application 104. From the perspective of the host application 104, the host device 142 is a single data storage device having a set of contiguous fixed-size LBAs (Logical Block Addresses) on which data used by the host application 104 resides and can be stored. However, the data used by the host application 104 and the storage resources available for use by the host application 104 may actually be maintained by the compute nodes $116_1$-$116_4$ at non-contiguous addresses (tracks) on various different managed drives 132 on storage system 100.

In some embodiments, the storage system 100 maintains metadata that indicates, among various things, mappings between the production device 140 and the locations of extents of host application data in the virtual shared memory 138 and the managed drives 132. In response to an IO (Input/Output command) 146 from the host application 104 to the host device 142, the hypervisor/OS 112 determines whether the IO 146 can be serviced by accessing the host volatile memory 106. If that is not possible, then the IO 146 is sent to one of the compute nodes 116 to be serviced by the storage system 100.

In the case where IO 146 is a read command, the storage system 100 uses metadata to locate the commanded data, e.g., in the virtual shared memory 138 or on managed drives 132. If the commanded data is not in the virtual shared memory 138, then the data is temporarily copied into the virtual shared memory 138 from the managed drives 132 and sent to the host application 104 by the front-end adapter 126 of one of the compute nodes $116_1$-$116_4$. In the case where the IO 146 is a write command, in some embodiments the storage system 100 copies a block being written into the virtual shared memory 138, marks the data as dirty, and creates new metadata that maps the address of the data on the production device 140 to a location to which the block is written on the managed drives 132.

When an IO is processed by a storage system, an IO processing thread 160 will access metadata on the storage system to determine multiple aspects of how the IO should be implemented on the storage resources of the storage system. In some embodiments, metadata is stored in metadata storage 170 implemented using a persistent memory such as Flash to ensure the integrity of the metadata in the event of a power failure. However, to accelerate processing of IO operations, pages of metadata are dynamically paged into IO thread metadata resources 175 which is implemented using a faster memory such as a dynamic memory, and once the required metadata page has been loaded to the dynamic memory, the IO processing thread is able to access the metadata pages in IO thread metadata resources 175 to use the metadata to implement the IO operation on the storage system. The dynamic memory used by the IO processing thread to access metadata pages is referred to herein as "IO thread metadata resources" 175.

Certain IO operations, for example particular IO operations that involve read and write operations on snapshot copies of storage volumes can require the IO processing thread to access multiple metadata pages. When an IO operation is implemented and one or more of the metadata page(s) required by the IO processing thread are not contained in IO thread metadata resources, (an operation that is referred to herein as a metadata miss), the IO processing thread will send a request to a MetaData Page (MDP) thread to instruct the MDP thread to insert the required metadata page into IO thread metadata resources 175. The MDP thread takes a finite amount of time to retrieve the requested metadata pages from metadata storage 170, and to page-in the requested metadata pages to IO thread metadata resources 175. Accordingly, the occurrence of a metadata miss event is a costly operation to the storage system, and can greatly impact the overall amount of time it takes the storage system to process an IO operation. For complicated operations, such as a write IO operations to a snapshot volume or for a read/write operation to a target volume that is linked to a snapshot, which may require sequential access to multiple metadata pages, a metadata page miss event can greatly impact the storage system response time.

In some embodiments, a method and apparatus for metadata page prefetch processing for incoming IO operations is provided to increase storage system IO performance by reducing the frequency of metadata page miss events during IO processing.

In some embodiments, when an IO is received at a storage system, the IO is placed in an IO queue 180, such as a fibre channel/common driver interface (FC/CDI) queue, to be scheduled for processing by an IO processing thread (IO thread) 160. When the IO is placed in the IO queue 180, a metadata page prefetch thread 155 reads the LBA address of the IO that has been placed in the IO queue 180 asynchronously from the IO processing thread 160, and determines whether all of the metadata page(s) that will be needed by the IO processing thread 160 are contained in IO thread metadata resources 175. As used herein, the term "IO thread metadata resources 175" (also referred to herein simply as "metadata resources"), is used to refer to a temporary storage area used by the IO processing thread 160 to hold metadata pages required by the IO thread 160 when processing IO operations. Metadata pages are moved from metadata storage 170 into and metadata resources 175 as required by the IO thread 160 by a MetaData Page (MDP) thread 165. In some embodiments, IO thread metadata resources 175 are implemented using a dynamic memory configured to have a very fast response time.

In response to a determination that one or more of the required metadata pages are not contained in IO thread metadata resources 175, the metadata page prefetch thread 155 instructs the MDP thread 165 to move the required metadata page(s) from metadata storage 170, such as flash, to IO thread metadata resources 175.

When the IO is dequeued from the IO queue 180 to the IO processing thread 160, the IO processing thread 160 attempts to access any required metadata page(s) from IO thread metadata resources 175. Since the metadata page prefetch thread 155 operates asynchronously from the IO processing thread 160, and does not need to wait for the IO to be dequeued from IO queue 180 prior to instructing the MDP thread 165 to move the required metadata page(s) from metadata storage 170 to IO thread metadata resources 175, it is possible to reduce the number of metadata page misses experienced by the IO processing thread 160. This increases performance of the storage system, particularly in connection with metadata intensive IO operations such as write IOs to snapshot volumes and read IOs to target devices that are linked to snapshot volumes.

Figure 2:
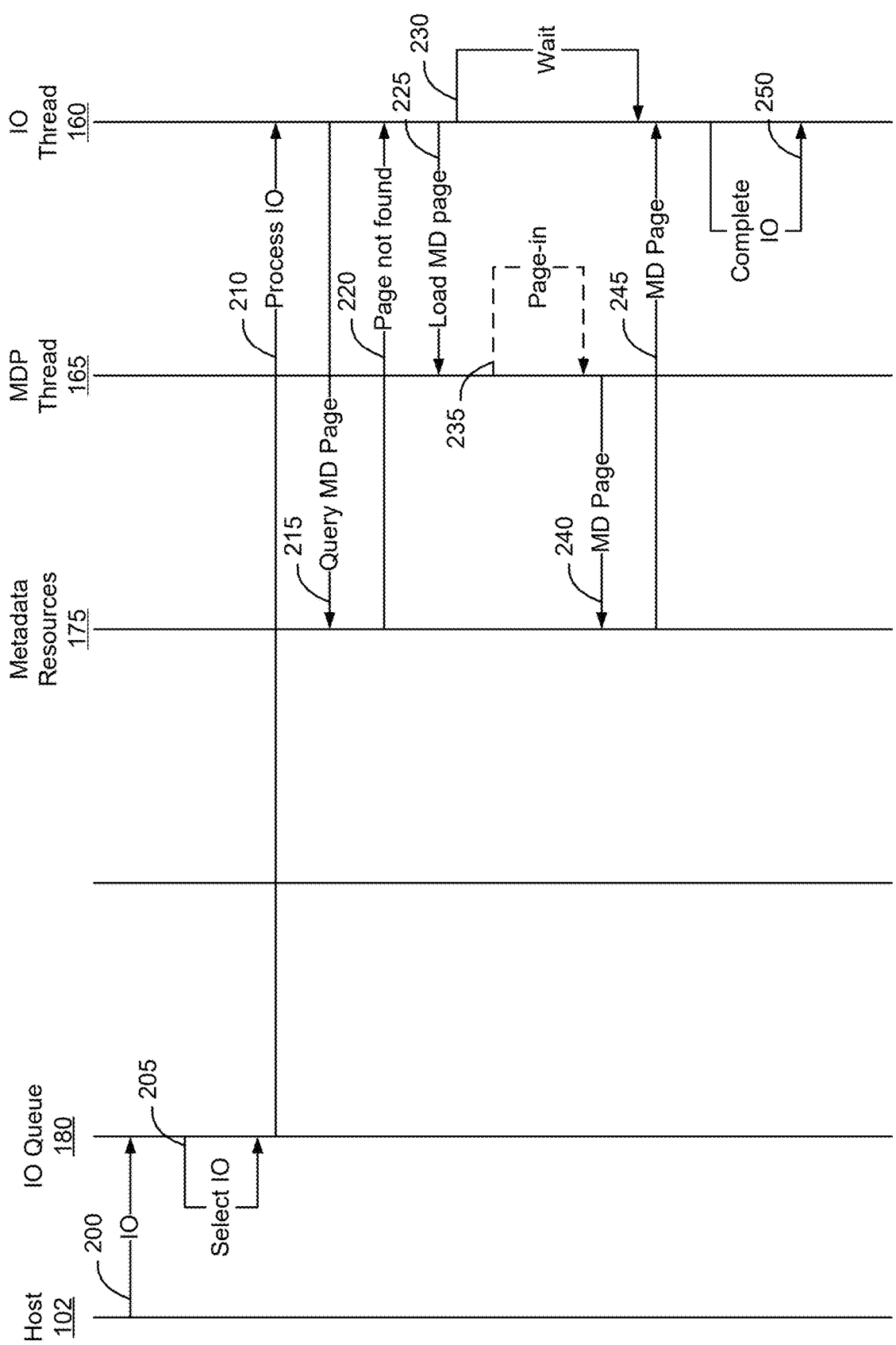
FIG. 2 is a swim lane diagram of an example method of processing an incoming IO operation without the use of a metadata page prefetch thread when a required metadata page is not previously included in IO thread metadata resources, according to some embodiments.

FIG. 2 is a swim lane diagram of an example method of processing an incoming IO operation without the use of a metadata page prefetch thread 155 when a required metadata page is not previously included in IO thread metadata resources 175, according to some embodiments. As shown in FIG. 2, when an IO operation is sent by a host (arrow 200) the host IO is placed in an IO queue 180. At a later point in time, the IO is selected from the IO queue 180 for processing (arrow 205). The amount of time it takes to select a particular IO from the IO queue 180 for processing may vary, depending on the type of IO operation and numerous other factors.

Once the IO processing thread 160 has selected the IO operation for processing (arrow 210), the IO thread 160 will query IO thread metadata resources 175 for any required metadata page (arrow 215). In the example shown in FIG. 2, a metadata page miss event has occurred and the required metadata page is not found in metadata resources 175 (arrow 220). Accordingly, the IO thread 160 instructs the MDP thread 165 to load the required metadata page (arrow 225) and then waits (arrow 230) until the requested metadata page has been loaded to metadata resources 175. The MDP thread 165 loads the page (arrow 235, 240) to metadata resources 175. The IO thread 160 then retrieves the metadata page from IO thread metadata resources 175 (arrow 245) and completes the IO (arrow 250). It should be noted that some IO operations require subsequent metadata page accesses. Accordingly, in some instances the "complete IO" arrow 250 might require iteration of the steps 215-245, which can cause the IO thread 160 to spend considerable amount of time waiting as metadata pages are sequentially requested and subsequently loaded into IO thread metadata resources 175.

Figure 3:
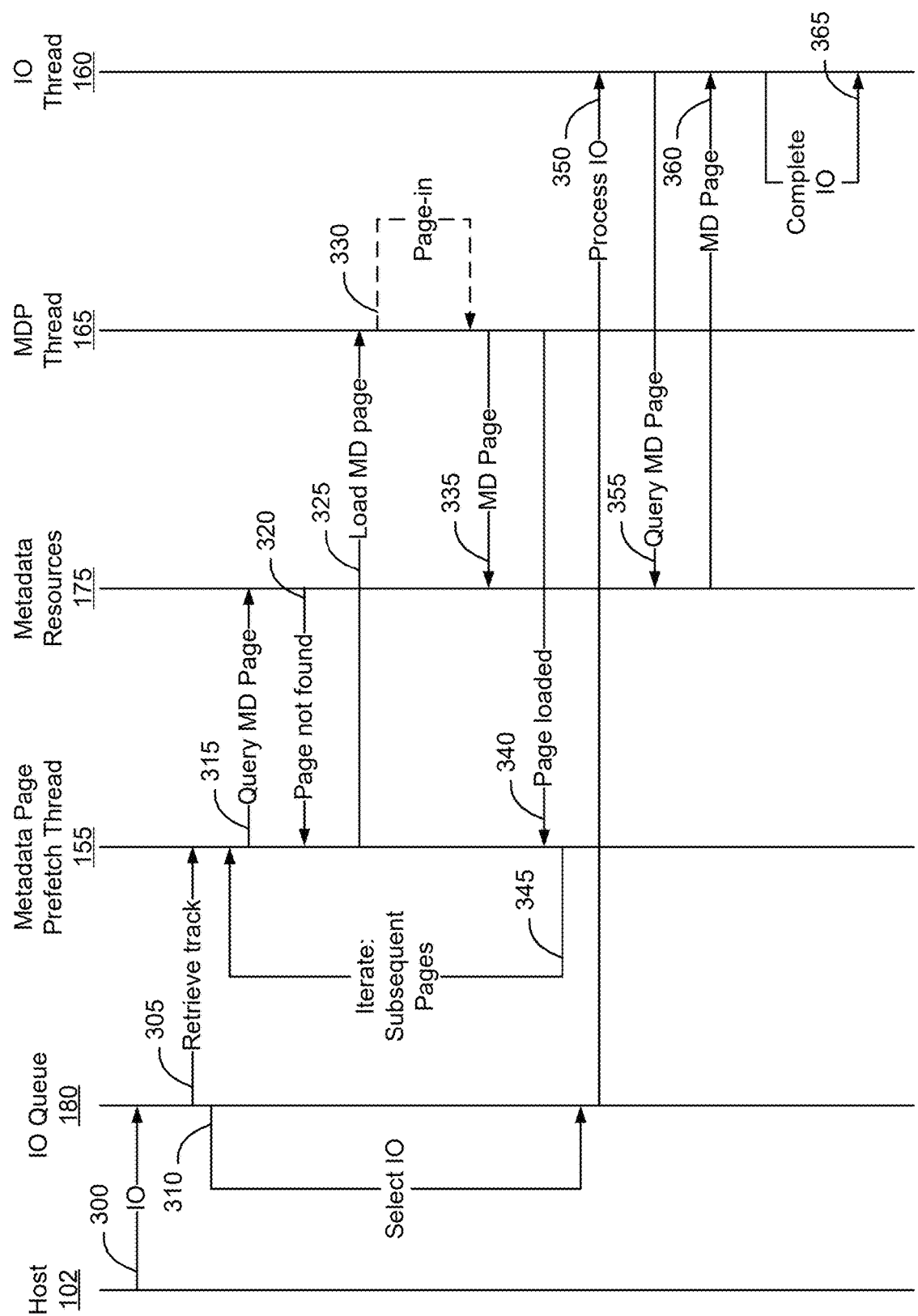
FIG. 3 is a swim lane diagram of an example method of processing an incoming IO operation using a metadata page prefetch thread when a metadata page required by an IO processing thread is not previously included in IO thread metadata resources, according to some embodiments.

FIG. 3 is a swim lane diagram of an example method of processing an incoming IO operation using a metadata page prefetch thread 155 when a metadata page required by an IO processing thread 160 is not previously included in IO thread metadata resources 175, according to some embodiments. As shown in FIG. 3, when a host IO is sent by a host (arrow 300) the host IO is placed in an IO queue 180. At a later point in time, the IO will be selected from the IO queue 180 for processing (arrow 310). The amount of time it takes to select a particular IO from the IO queue 180 for processing may vary, depending on the type of IO operation and numerous other factors.

Asynchronously from the IO thread 160, in some embodiments the metadata page prefetch thread 155 determines the Logical Unit Number (LUN) associated with the IO that is stored in the IO queue 180 (arrow 305). The LUN is used to identify a track associated with the IO operation by the metadata page prefetch thread 155. Using the track identification information, the metadata page prefetch thread 155 queries IO thread metadata resources 175 to determine whether the metadata page(s) required by the IO thread are contained in IO thread metadata resources (arrow 315).

In the example shown in FIG. 3, the metadata page containing the required metadata for the track associated with the IO that is currently stored in the IO queue 180 is not found in IO thread metadata resources 175 (arrow 320). In response to a determination that one or more of the required metadata pages is not contained in IO thread metadata resources 175, the metadata page prefetch thread 155 instructs the MDP thread to load the required metadata pages from metadata storage 170 to IO thread metadata resources 175 (arrow 325). The MDP thread 165 processes the page-in request (arrow 330) and the MDP thread 165 loads the required metadata page or set of metadata pages to IO thread metadata resources 175 (arrow 335). Optionally, the MDP thread 165 may notify the metadata page prefetch thread 155 that the requested page(s) has been loaded (arrow 340). In instances where multiple metadata pages are required to be sequentially loaded to IO thread metadata resources 175, the metadata page prefetch thread 155 may interact with the MDP thread multiple times such that the process described in connection with arrows 315-340 may iterate (arrow 345) until the metadata page prefetch thread 155 has caused the MDP thread to pre-load all required metadata pages to IO thread metadata resources 175.

In the example shown in FIG. 3, after the MDP thread 165 has loaded the requested metadata pages to IO thread metadata resources 175, the IO thread 160 selects the IO operation for processing from the IO queue 180 (arrow 350). Because the metadata page prefetch thread 155 has previously interacted with the MDP thread 165 to instruct the MDP thread 165 to load all of the metadata pages required by the IO thread 160 to process the IO operation, when the IO thread 160 queries IO thread metadata resources 175 for the required metadata page (arrow 355), the required metadata page will be available in IO thread metadata resources 175 and can be returned to the IO thread 160 (arrow 360). This enables the IO thread 160 to complete IO processing (arrow 365) without requiring the IO thread 160 to instruct the MDP thread 165 to retrieve the required metadata page and without requiring the IO thread 160 to wait while the MDP thread 165 implements the metadata page-in process. Accordingly, by implementing an asynchronous metadata page prefetch thread 155 responsible for asynchronously identifying metadata pages that should be loaded to IO thread metadata resources 175, and enabling the metadata page prefetch thread to interact with the MDP thread to cause the required pages to be pre-loaded to IO thread metadata resources 175, it is possible to accelerate processing of the IO operations by the IO thread 160 by reducing the frequency of metadata page miss events on IO thread metadata resources 175.

Figure 4:
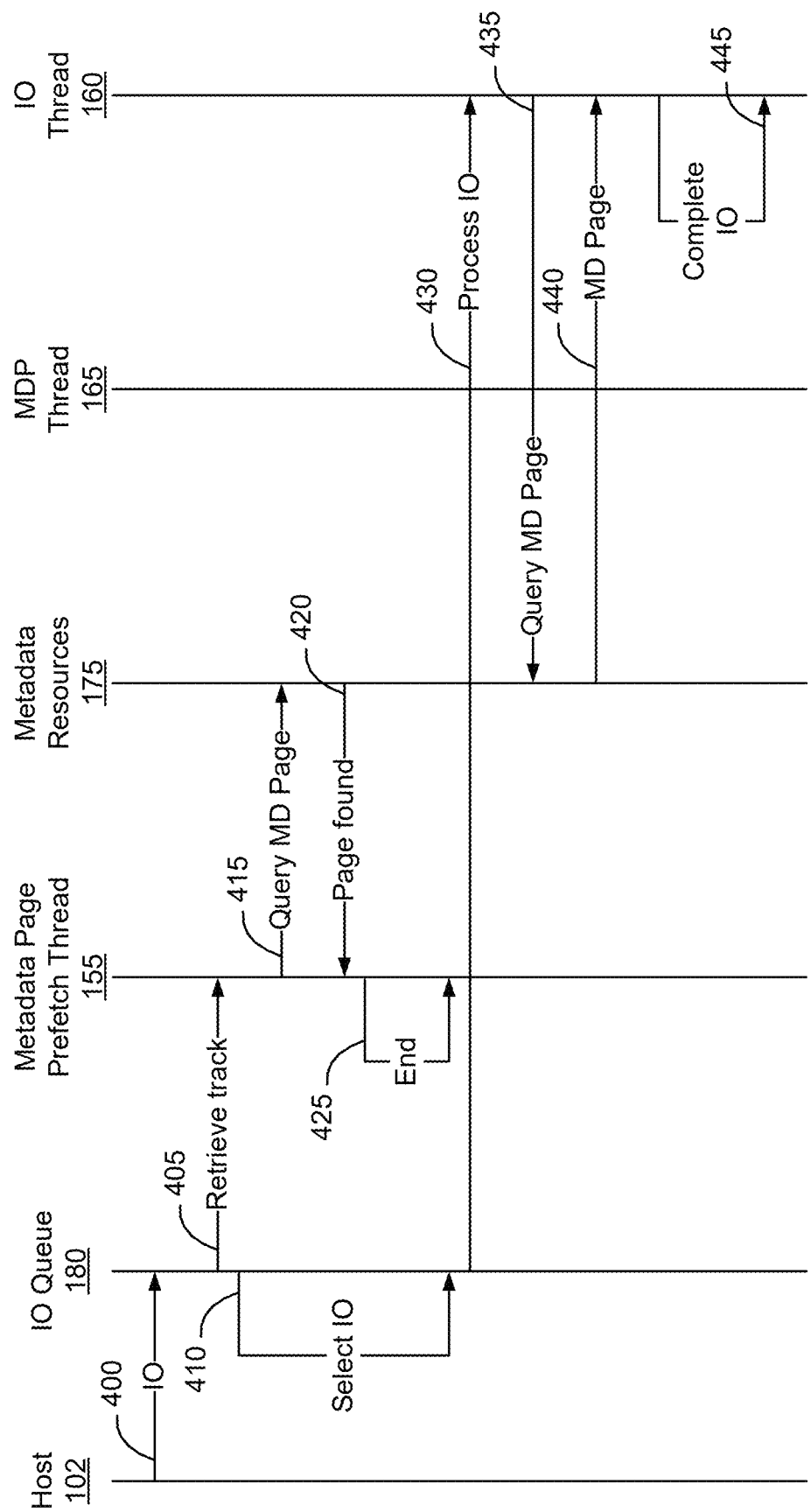
FIG. 4 is a swim lane diagram of an example method of processing an incoming IO operation using a metadata page prefetch thread when a metadata page required by an IO processing thread is previously included in IO thread metadata resources, according to some embodiments.

FIG. 4 is a swim lane diagram of an example method of processing an incoming IO operation using a metadata page prefetch thread 155 when a metadata page required by an IO processing thread 160 is previously included in IO thread metadata resources 175, according to some embodiments. As shown in FIG. 4, when a host IO is sent by a host (arrow 400) the host IO is placed in an IO queue 180. At a later point in time, the IO will be selected from the IO queue 180 for processing (arrow 410). The amount of time it takes to select a particular IO from the IO queue 180 for processing may vary, depending on the type of IO operation and numerous other factors.

Asynchronously from the IO thread 160, in some embodiments the metadata page prefetch thread 155 determines the Logical Unit Number (LUN) associated with the IO that is stored in the IO queue 180 (arrow 405). The LUN is used to identify a track associated with the IO operation by the metadata page prefetch thread 155. Using the track identification information, the metadata page prefetch thread 155 queries IO thread metadata resources 175 to determine whether a page including metadata for the IO worker thread 160 is contained in IO thread metadata resources 175 (arrow 415). In the example shown in FIG. 3, the metadata page containing the required metadata for the track associated with the IO that is currently stored in the IO queue 180 is found in IO thread metadata resources 175 (arrow 420). Accordingly, the metadata page prefetch thread 155 is not required to interact with the MDP thread 165 (arrow 425) and can move on to implement metadata page prefetch processing for other IO operations in the IO queue 180.

In the example shown in FIG. 4, the IO thread 160 then selects the IO operation for processing from the IO queue 180 (arrow 430). Because the metadata page prefetch thread 155 has previously confirmed that all of the metadata pages required by the IO thread 160 to process the IO operation are contained in IO thread metadata resources 175, when the IO thread 160 queries IO thread metadata resources 175 for the required metadata page (arrow 435), the required metadata page will be available in IO thread metadata resources 175 and can be returned to the IO thread 160 (arrow 440). This enables the IO thread 160 to complete IO processing (arrow 445) without requiring the IO thread to instruct the MDP thread 165 to retrieve the required metadata page and without requiring the IO thread to wait while the MDP thread 165 implements the metadata page-in process.

Figure 5:
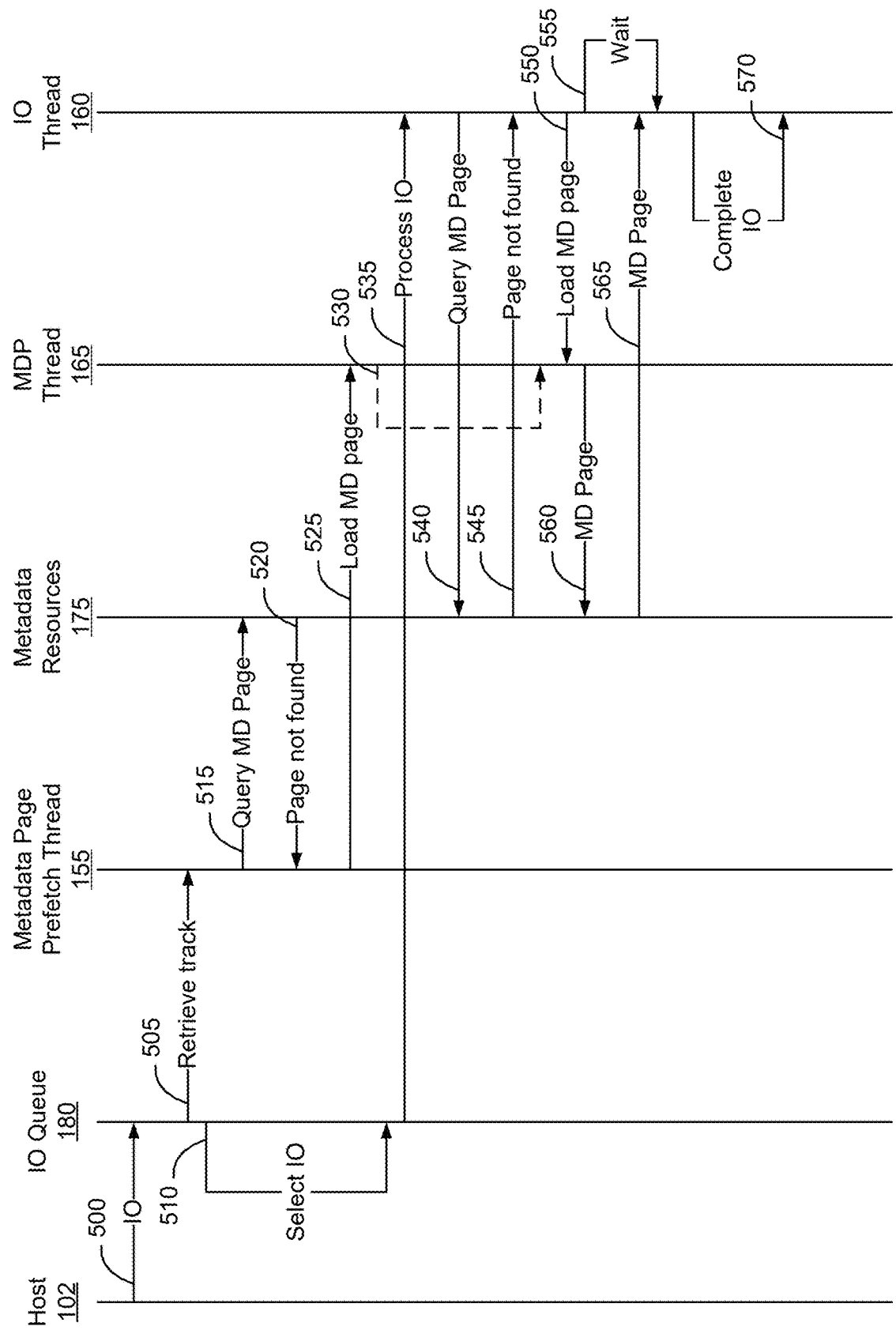
FIG. 5 is a swim lane diagram of an example method of processing an incoming IO operation using a metadata page prefetch thread when a metadata page required by an IO processing thread is not previously included in IO thread metadata resources, according to some embodiments.

FIG. 5 is a swim lane diagram of an example method of processing an incoming IO operation using a metadata page prefetch thread 155 when a metadata page required by an IO processing thread 160 is not previously included in IO thread metadata resources 175, according to some embodiments. In the example shown in FIG. 5, the IO is selected for processing from the IO queue 180 by the IO processing thread 160 before the MDP thread 165 is able to complete the process of loading the requested metadata page into IO thread metadata resources 175.

Specifically, as shown in FIG. 5, when a host IO is sent by a host (arrow 500) the host IO is placed in an IO queue 180. At a later point in time, the IO will be selected by the IO thread 160 from the IO queue 180 for processing (arrow 510). The amount of time it takes to select a particular IO from the IO queue 180 for processing may vary, depending on the type of IO operation and numerous other factors.

Asynchronously from the IO thread 160, in some embodiments the metadata page prefetch thread 155 determines the Logical Unit Number (LUN) associated with the IO that is stored in the IO queue 180 (arrow 505). The LUN is used to identify a track associated with the IO operation by the metadata page prefetch thread 155. Using the track identification information, the metadata page prefetch thread 155 queries IO thread metadata resources 175 to determine whether a page including metadata for the IO worker thread 160 is contained in IO thread metadata resources 175 (arrow 515). In the example shown in FIG. 5, the metadata page containing the required metadata for the track associated with the IO that is currently stored in the IO queue 180 is not found in IO thread metadata resources 175 (arrow 520). In response to a determination that one or more of the required metadata pages is not contained in IO thread metadata resources 175, the metadata page prefetch thread 155 instructs the MDP thread 165 to load the required metadata page(s) to IO thread metadata resources 175 (arrow 525). The MDP thread 165 thus begins to process the page-in request (arrow 530) to start the process of loading the required metadata page or set of metadata pages from metadata storage 170 to metadata resources 175.

In the example shown in FIG. 5, before the MDP thread 165 is able to complete the process of paging in the requested metadata pages (arrow 535), the IO thread 160 selects the host IO for processing (arrow 510). Once the IO processing thread 160 has selected the IO operation for processing (arrow 535) the IO thread 160 will query IO thread metadata resources 175 for any required metadata page (arrow 540). In the example shown in FIG. 2, a metadata page miss event has occurred and the required metadata page is not found in metadata resources 175 (arrow 545). Accordingly, the IO thread 160 instructs the MDP thread 165 to load the required metadata page (arrow 550) and then waits (arrow 555) until the requested metadata page has been loaded to metadata resources 175. The MDP thread 165 loads the page (arrow 530, 560) to metadata resources 175. The IO thread 160 then retrieves the metadata page from IO thread metadata resources 175 (arrow 565) and completes the IO (arrow 570). Because the metadata page prefetch thread 155 instructed the MDP thread 165 to fetch the required metadata page(s) before the IO was selected for processing by the IO thread 160 (prior to arrow 535), the MDP thread 165 is able to begin working on the process of fetching the required metadata pages at an earlier point in time, thus shortening the amount of time that the IO thread 160 needs to wait (arrow 555) relative to embodiments that do not include a metadata page prefetch thread 155, such as shown in FIG. 2.

Figure 6:
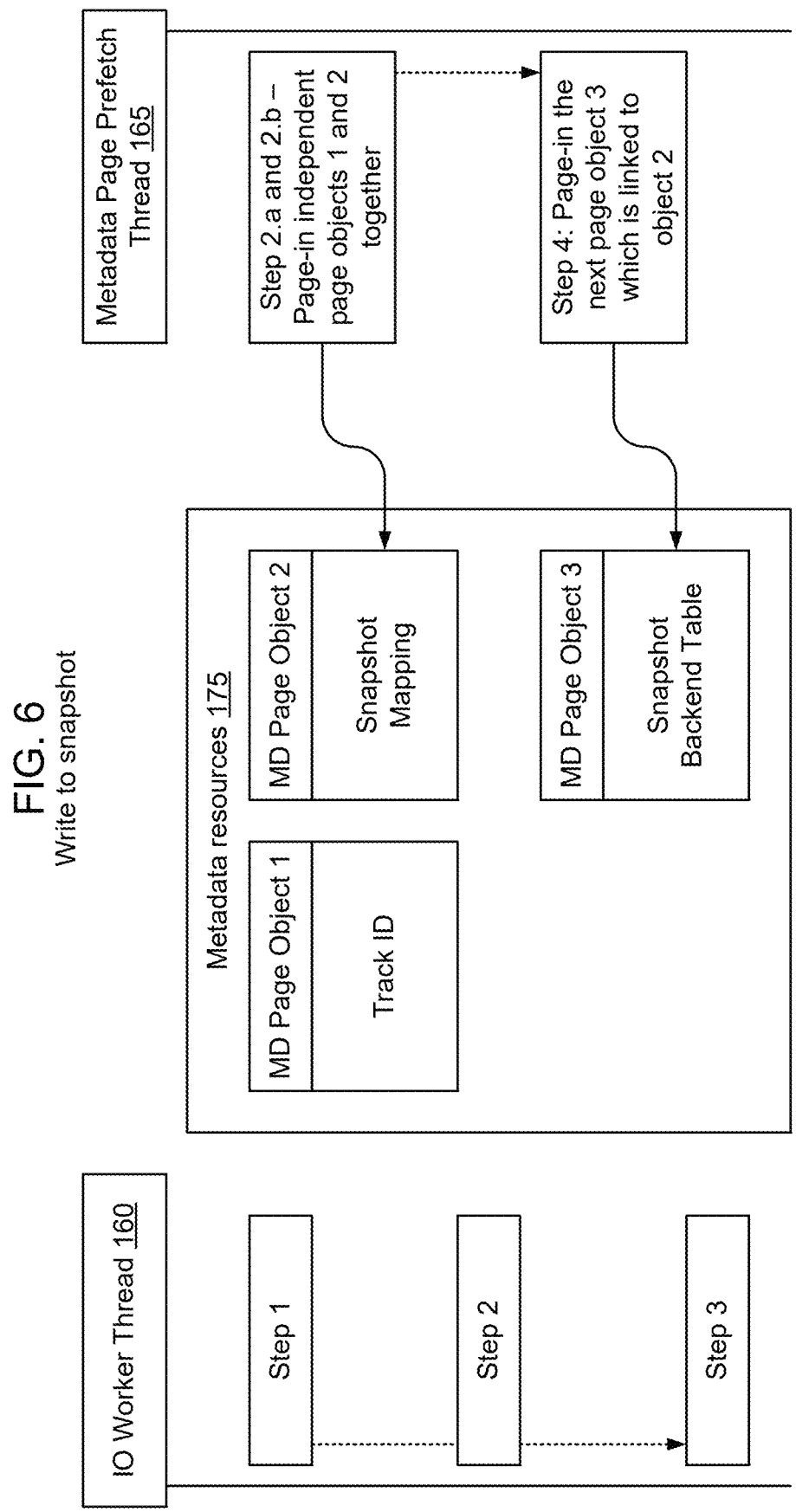
FIG. 6 is a block diagram showing asynchronous operations of an IO thread and a metadata page prefetch thread in connection with processing a write IO operation to a snapshot, according to some embodiments.

FIG. 6 is a block diagram showing asynchronous operations of an IO thread 160 and a metadata page prefetch thread 155 in connection with processing a write IO operation to a snapshot, according to some embodiments. Some IO operations, such as write IO operations on a snapshot volume involve multiple metadata page access operations. A snapshot, as that term is used herein, is a point in time copy of a volume of data. As shown in FIG. 6, in some embodiments when a write operation is received on a snapshot (step 1), the metadata page prefetch thread 155 reads the LUN to identify the track associated with the write operation, and instructs the MDP thread 165 to insert metadata page object #1 containing the track ID and metadata page object #2 containing the snapshot mapping into IO thread metadata resources 175. The metadata page prefetch thread 155 uses the metadata page object #2 to identify a subsequent linked metadata page object #3 that should be also loaded, and instructs the MDP thread 165 to load metadata page object #3 containing a snapshot backend table to IO thread metadata resources 175. Asynchronously, the IO thread 160 implements step 2 of IO processing, which requires use of metadata page object #1 and metadata page object #2, and then implements step 3 of IO processing, which requires use of metadata page object #3. By pre-loading the metadata page objects to IO thread metadata resources 175, the IO thread 160 is more likely to locate all required metadata page objects in IO thread metadata resources 175, thus accelerating processing of the write IO operation on a snapshot volume.

For example, in some embodiments when a write IO command arrives on the storage system (step 1), the metadata page prefetch thread 155 reads the IO LBA address to determine the track ID, and reads the track ID metadata entry. If the volume has an active snapshot, then the metadata page prefetch thread 155 reads the snapshot mapping metadata entry (step 2a) and sets the track versioning in the track ID table by saving the snapshot mapping entry (step 2b). The IO worker thread 160 accepts the write data into a cache slot (step 3). The metadata page prefetch thread 155 asynchronously reads the snapshot replication backend entry to save the old data (for example using redirect-on-write or copy-on-write) and, in the case of a target linked volume, reads the snapshot replication backend entry based on the snapshot mapping entry to bring-in snapshot data to make it a full track write pending (step 4). The IO worker thread 160 completes the write IO to enable the write to be subsequently destaged to disk (step 5). By enabling metadata pages that will be required for the write IO to be identified and loaded to IO thread metadata resources 175 asynchronously from IO operations that utilize the metadata pages, it is possible to improve the response time when processing write IO operations on snapshots.

Figure 7:
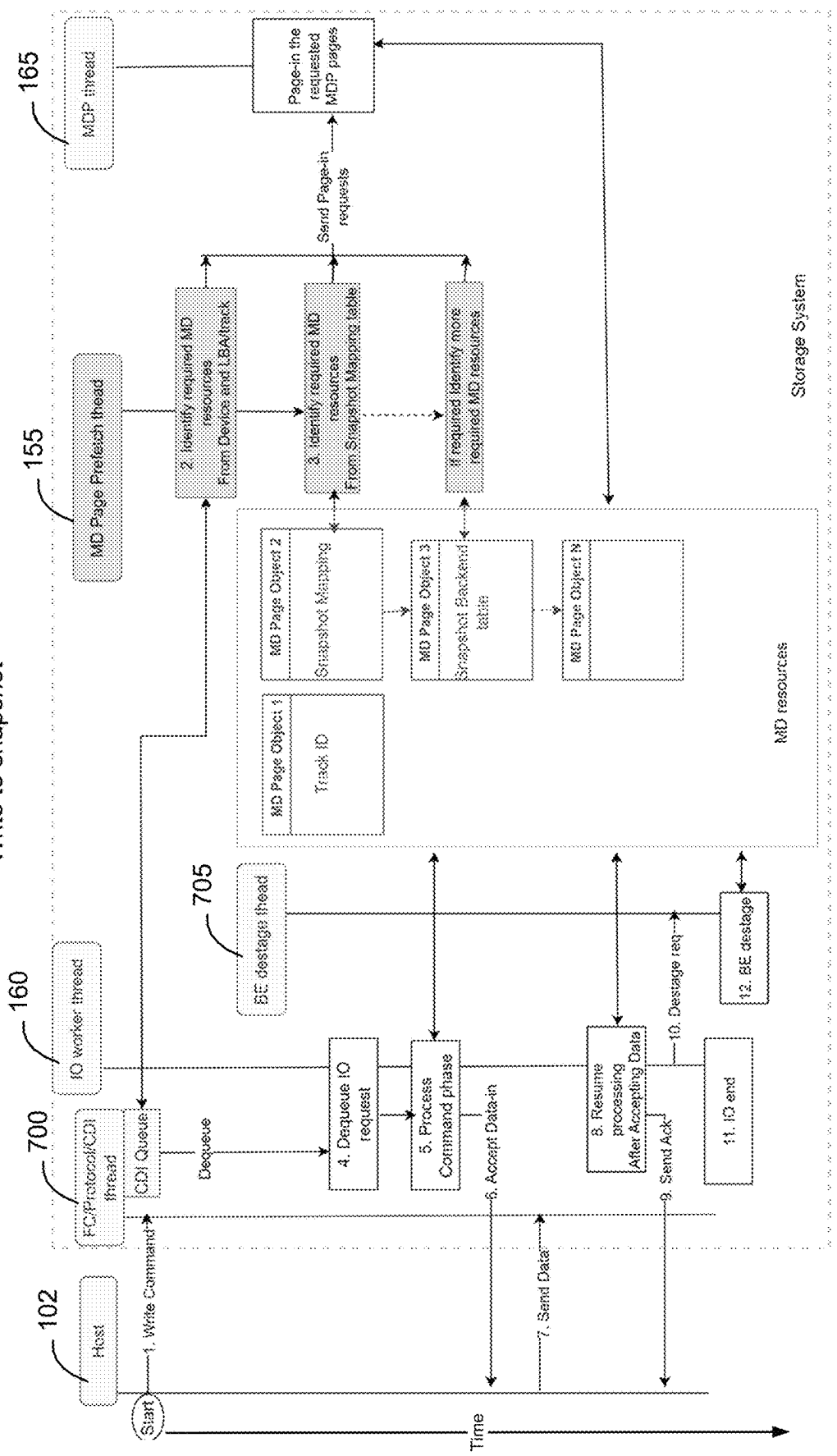
FIG. 7 is a swim lane diagram showing asynchronous operations of the IO thread and the metadata page prefetch thread of FIG. 6 in greater detail, according to some embodiments.

FIG. 7 is a swim lane diagram showing asynchronous operations of the IO thread 160 and the metadata page prefetch thread 155 of FIG. 6 in greater detail, according to some embodiments. As shown in FIG. 7, when a host sends a write command (arrow 1), the write command is received by a fibre channel/protocol/Common Driver Interface (CDI) thread 700 and placed in a CDI queue 180. The metadata page prefetch thread 155 identifies required metadata page objects from the device and Logical Block Address/track (block 2), and sends a page-in request to the MDP thread 165 to load metadata page object #1 and metadata page object #2 to IO thread metadata resources 175. The metadata page prefetch thread 155 then identifies required metadata resources from the snapshot mapping table contained in metadata page object #2 (block 3) and sends a page-in request to the MDP thread 165 to instruct the MDP thread 165 to page-in metadata page object #3. If required, the metadata page prefetch thread 155 iterates this process to load any additional metadata pages to metadata resources 175.

The IO worker thread 160 asynchronously requests that the IO be dequeued (block 4) and begins the process command phase (block 5), which includes reading metadata contained in metadata page objects 1 and 2. The IO worker thread 160 allocates a slot of global memory to the write IO and sends a request to the host 102 to instruct the host to begin transmission of the data associated with the write IO (arrow 6). The host sends the data (arrow 7) and the IO worker thread 160 resumes processing of the IO operation after receipt of the data (block 8), which includes accessing additional metadata that has been previously requested by the metadata page prefetch thread 155 and previously loaded by the MDP thread 165 to IO thread metadata resources 175.

After processing the write IO, the IO worker thread 160 sends an acknowledgment to the host (arrow 9). The IO worker thread then sends a destage request (arrow 10) to a back end destage thread 705 configured to move data from shared global memory 138 to backend storage resources 130. The IO thread, at that point, has completed its processing steps and the IO processing ends (block 11). At some later point, the back end destage thread 705 will destage (move) the data to back-end storage resources (block 12).

Figure 8:
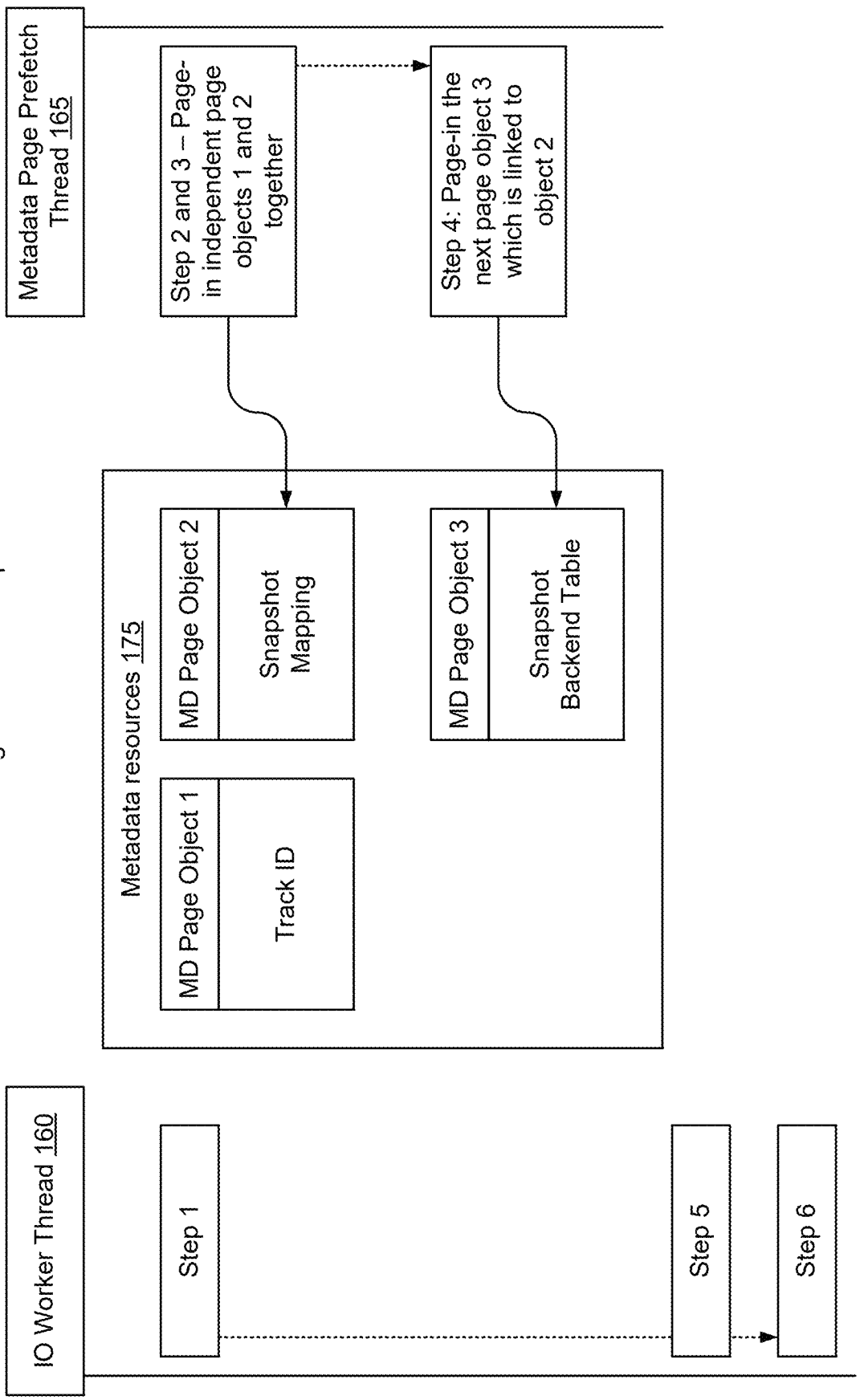
FIG. 8 is a block diagram showing asynchronous operations of an IO thread and a metadata page prefetch thread in connection with processing a read IO operation to a target device linked to a snapshot, according to some embodiments.

FIG. 8 is a block diagram showing asynchronous operations of an IO thread 160 and a metadata page prefetch thread 155 in connection with processing a read IO operation to a target device linked to a snapshot, according to some embodiments. As shown in FIG. 8, when a read IO is received from a host on a target device that is linked to a snapshot (step 1), based on the IO LBA address, the metadata page prefetch thread 155 instructs the MDP thread 165 to load metadata page object #1 containing the track ID metadata entry. In instances where the volume is a target linked volume, the metadata page prefetch thread 155 also instructs the MDP thread 165 to load metadata page object #2 containing the snapshot mapping metadata entry (steps 2 and 3). In some embodiments, the metadata page prefetch thread 155 instructs the MDP thread 165 to load metadata page objects #1 and 2 together. The metadata page prefetch thread 155 then instructs the MDP thread 165 to load metadata page object #3 containing a snapshot replication backend entry pointed to by the snapshot mapping entry of metadata page object #2 (step 4). Once all the required metadata objects have been loaded to IO thread metadata resources 175, the IO worker thread 160 reads the disk track pointed by the replication entry and brings the snapshot data into a slot of shared global memory (step 5). The data is then read out to the host (step 6) to complete the IO processing. By implementing metadata page prefetch operations using the metadata page prefetch thread 155, it is possible to significantly reduce the amount of time it takes the IO processing thread to implement snapshot read operations when the host read IO operations are on target devices that are linked to a snapshots.

Figure 9:
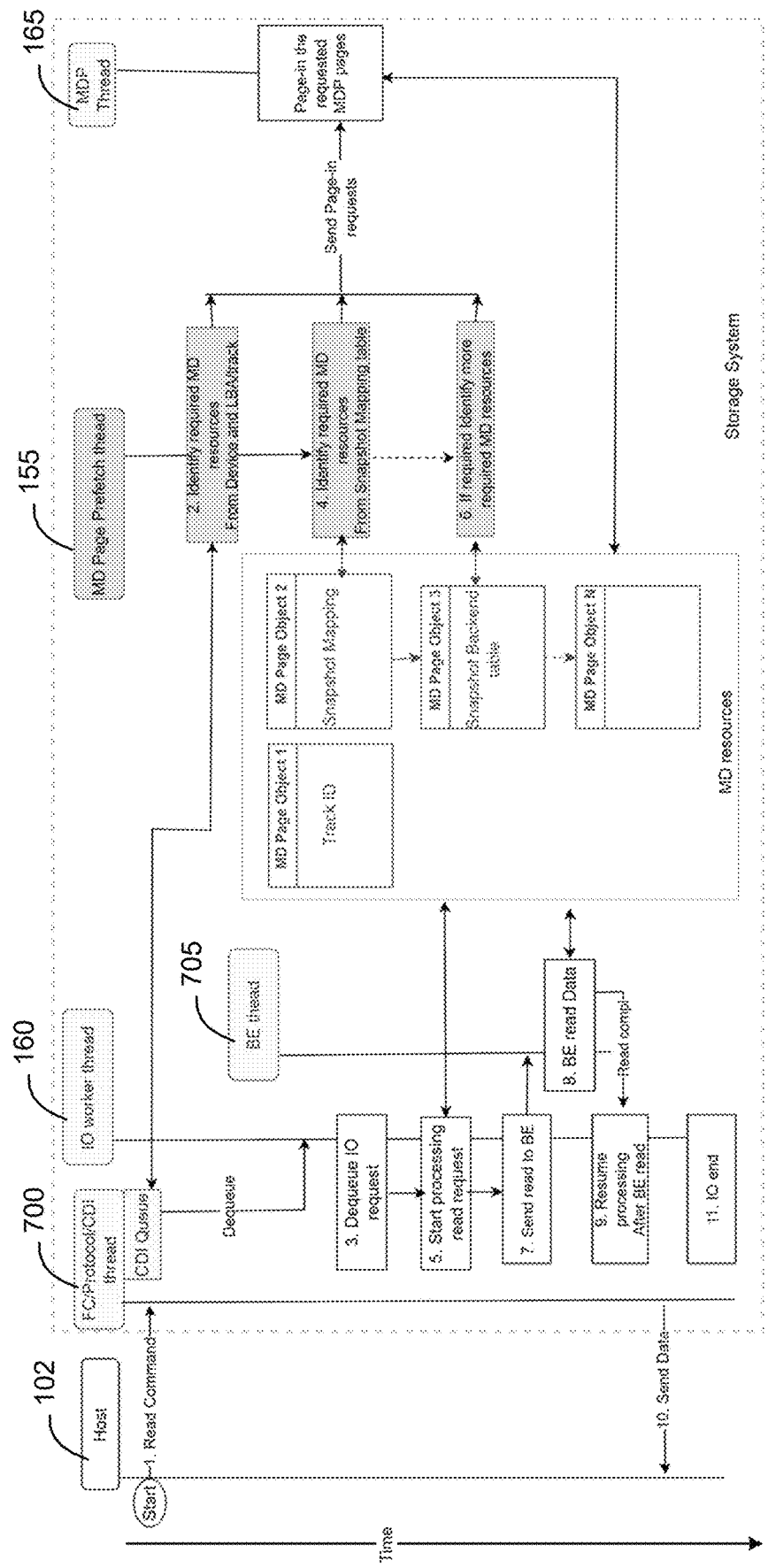
FIG. 9 is a swim lane diagram showing asynchronous operations of the IO thread and the metadata page prefetch thread of FIG. 8 in greater detail, according to some embodiments.

FIG. 9 is a swim lane diagram showing asynchronous operations of the IO thread 160 and the metadata page prefetch thread 155 of FIG. 8 in greater detail, according to some embodiments. As shown in FIG. 9, when a host sends a read command (arrow 1), the read command is received by a fibre channel/protocol/CDI thread 700 and placed in a CDI queue 180. The metadata page prefetch thread 155 identifies required metadata resources from the device and Logical Block Address/track (block 2), and sends a page-in request to the MDP thread 165 to load metadata page object #1 and metadata page object #2 to IO thread metadata resources 175. The metadata page prefetch thread 155 then identifies required metadata resources from the snapshot mapping table contained in metadata page object #2 (block 4) and sends a page-in request to the MDP thread 165 to instruct the MDP thread 165 to page-in metadata page object #3. If required, the metadata page prefetch thread 155 iterates to load any additional metadata pages to metadata resources 175 (block 6).

The IO worker thread 160 asynchronously requests that the IO be dequeued (block 3) and begins processing the read request (block 5) using the metadata objects 1, 2, 3, contained in IO thread metadata resources 175, and then sends a read request (block 7) to a back-end thread 705 responsible for retrieving data from back-end storage resources 130. The back-end thread 705 reads the data (block 8) to cause the requested data to be read into a slot of shared global memory. The IO thread 160 resumes processing of the IO read operation after the back-end thread 705 has read the data to shared global memory (block 9), transmits the requested data to the host (arrow 10), and the read IO ends (block 11). By implementing metadata page prefetch operations using the metadata page prefetch thread 155, it is possible to significantly reduce the amount of time it takes the IO processing thread to implement snapshot read operations when the host read IO operation is on a target device that is linked to a snapshot.

Figure 10:
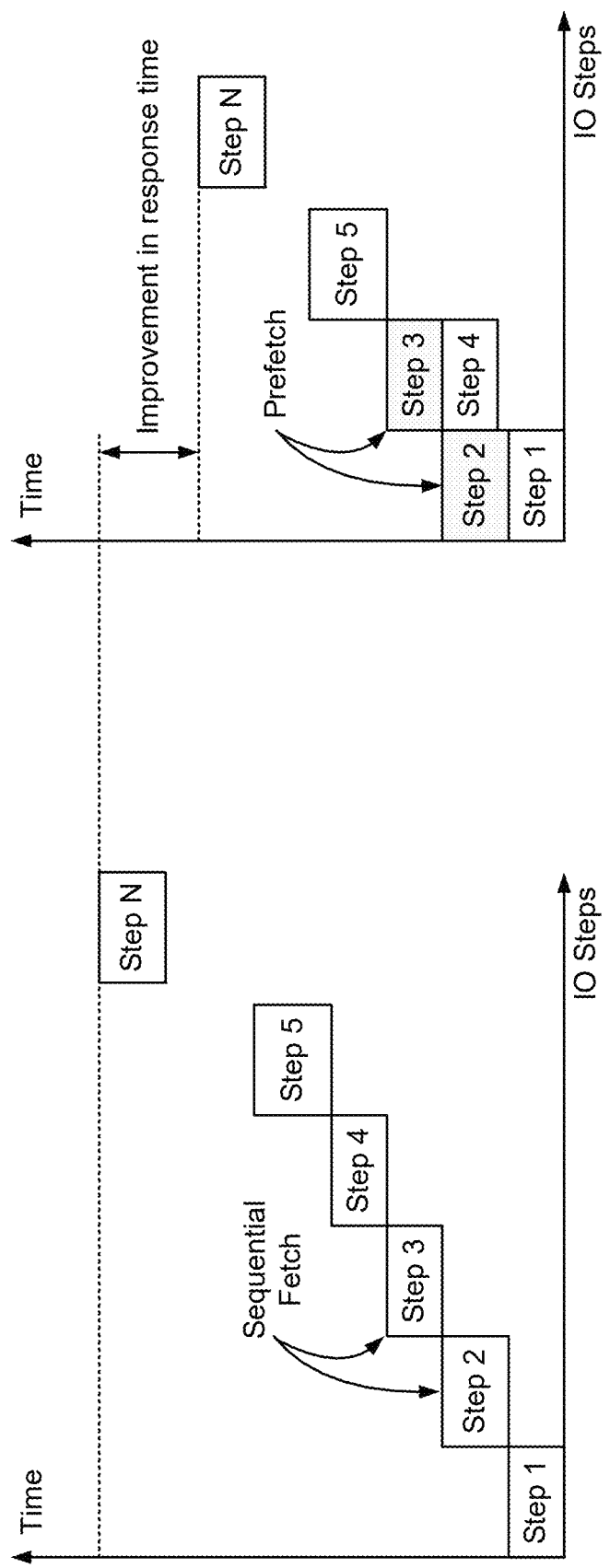
FIG. 10 is a view of two graphs showing IO processing steps over time, comparing a sequential approach in which metadata pages are sequentially fetched into metadata resources by an IO process when needed (left-hand graph), and a parallel approach in which metadata pages are asynchronously prefetched into metadata resources by a separate metadata page prefetch thread 155 (right-hand graph), according to some embodiments.

FIG. 10 is a view of two graphs showing IO processing steps over time, comparing a sequential approach in which metadata pages are sequentially fetched into IO thread metadata resources 175 by an IO process when needed (left-hand graph), and a parallel approach in which metadata pages are asynchronously prefetched into IO thread metadata resources 175 by a separate metadata page prefetch thread 155 (right-hand graph), according to some embodiments. As shown in the left-hand graph of FIG. 10, in a sequential approach, when an IO thread 160 encounters a metadata page miss event and needs to request the MDP thread 165 to load a required metadata page to IO thread metadata resources 175, it takes longer to implement the N stage IO process than where metadata page objects are able to be asynchronously loaded to IO thread metadata resources 175 in advance (right-hand graph). By implementing metadata page prefetch operations early in the IO process, by a separate asynchronous metadata page prefetch thread 155, it is therefore possible to reduce IO latency. Since the number of IO operations a storage system is able to implement is dependent on IO latency, reducing metadata page miss events has the additional benefit of increasing the number of IO operations per second that are able to be implemented by the storage system.

Figure 11:
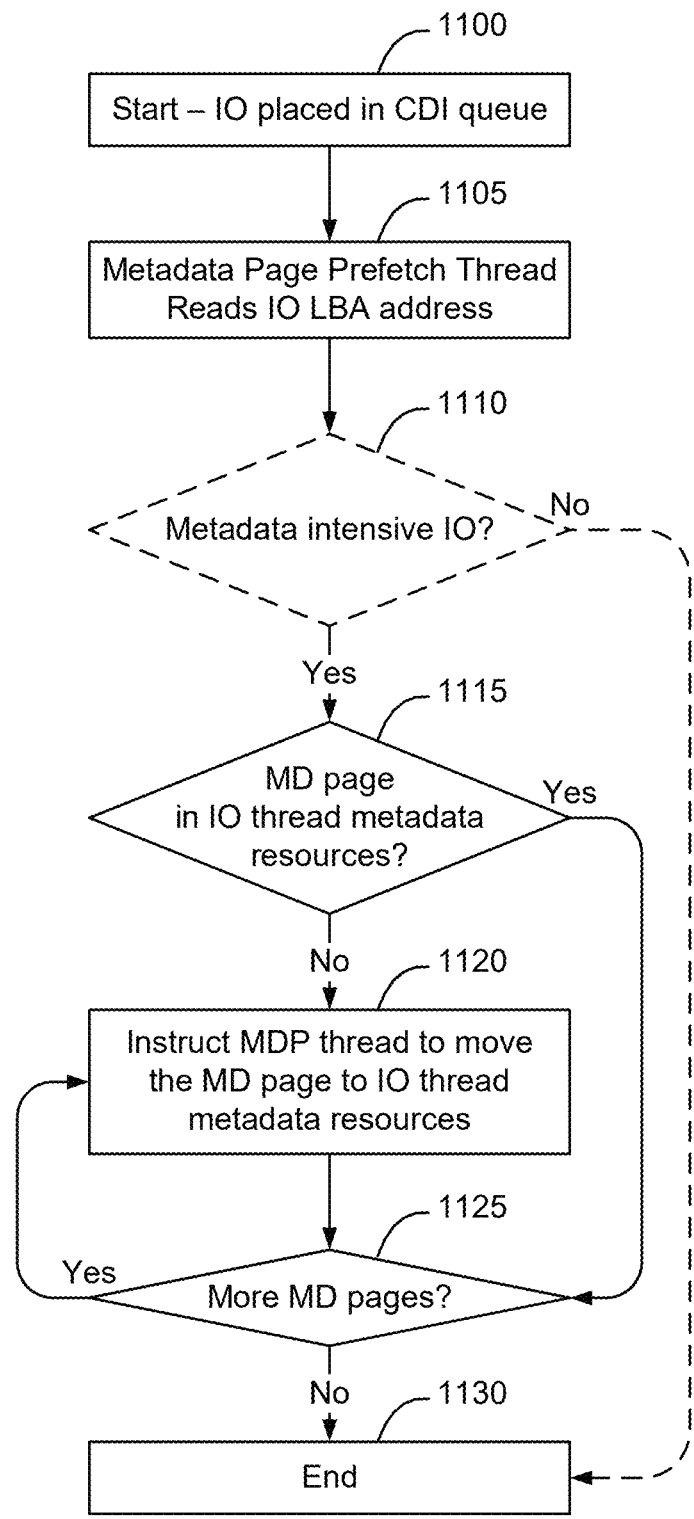
FIG. 11 is a flow chart of an example process of metadata page prefetch processing for incoming IO operations to increase storage system IO performance, according to some embodiments.

FIG. 11 is a flow chart of an example process of metadata page prefetch processing for incoming IO operations to increase storage system IO performance, according to some embodiments. As shown in FIG. 11, in some embodiments when an IO is received the IO is placed in an IO queue 180 (block 1100). When the IO is placed in the IO queue 180, the metadata page prefetch thread 155 accesses the IO to determine the type of the IO and the logical address associated with the IO (block 1105). For example, in some embodiments the metadata page prefetch thread 155 determines the logical block address (LBA) associated with the IO operation.

Optionally, in some embodiments, the metadata page prefetch thread 155 determines the type of IO operation to determine if the IO operation is likely to be a metadata intensive type of IO operation (block 1110). Example metadata intensive IO operations might include a write IO operation on a snapshot or a read IO operation on a target device that is linked to a snapshot volume. In some embodiments, in response to a determination that the IO operation is not anticipated to be an metadata intensive IO operation (a determination of NO at block 1110) the metadata page prefetch thread 155 does not pre-fetch metadata pages to IO thread metadata resources 175 and the prefetch operation ends (block 1130).

In response to a determination that the IO operation is likely to be metadata intensive IO operation (a determination of YES at block 1110), or in embodiments where the metadata page prefetch thread 155 is configured to implement metadata data page prefetch operations for all types of IO operations (by skipping block 1110), the metadata page prefetch thread 155 determines if a metadata page required by the IO thread 160 to process the IO operation is contained in IO thread metadata resources 175 (block 1115). In response to a determination that the metadata page required by the IO thread 160 to process the IO operation is not contained in IO thread metadata resources 175 (a determination of NO at block 1115), the metadata page prefetch thread 155 instructs the MDP thread 165 to move the metadata page to IO thread metadata resources 175 (block 1120).

In response to a determination that the metadata page required by the IO thread 160 to process the IO operation is already contained in IO thread metadata resources 175 (a determination of YES at block 1115), or after the metadata page prefetch thread 155 has instructed the MDP thread 165 to move the metadata page to IO thread metadata resources 175 (block 1120), the metadata page prefetch thread 155 determines if there are additional metadata pages that are required by the IO thread 160 to process the IO operation (block 1125). In response to a determination that additional metadata pages are required (a determination of YES at block 1125) the metadata page prefetch thread 155 returns to block 1120 to instruct the MDP thread 165 to move the metadata page to IO thread metadata resources 175. In response to a determination that no additional metadata pages are required (a determination of NO at block 1125) the metadata page prefetch operation ends (block 1130).

The methods described herein may be implemented as software configured to be executed in control logic such as contained in a CPU (Central Processing Unit) or GPU (Graphics Processing Unit) of an electronic device such as a computer. In particular, the functions described herein may be implemented as sets of program instructions stored on a non-transitory tangible computer readable storage medium. The program instructions may be implemented utilizing programming techniques known to those of ordinary skill in the art. Program instructions may be stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a FPGA (Field Programmable Gate Array) or microprocessor, or any other device including any combination thereof. Programmable logic can be fixed temporarily or permanently in a tangible non-transitory computer readable medium such as random-access memory, a computer memory, a disk drive, or other storage medium. All such embodiments are intended to fall within the scope of the present invention.

Throughout the entirety of the present disclosure, use of the articles "a" or "an" to modify a noun may be understood to be used for convenience and to include one, or more than one of the modified noun, unless otherwise specifically stated. The term "about" is used to indicate that a value includes the standard level of error for the device or method being employed to determine the value. The use of the term "or" in the claims is used to mean "and/or" unless explicitly indicated to refer to alternatives only or the alternatives are mutually exclusive, although the disclosure supports a definition that refers to only alternatives and to "and/or." The terms "comprise," "have" and "include" are open-ended linking verbs. Any forms or tenses of one or more of these verbs, such as "comprises," "comprising," "has," "having," "includes" and "including," are also open-ended. For example, any method that "comprises," "has" or "includes" one or more steps is not limited to possessing only those one or more steps and also covers other unlisted steps.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of metadata page prefetch processing for incoming IO operations, comprising:
   receiving an IO operation;
   placing the IO operation in an IO queue;
   determining, by a metadata page prefetch thread, that a metadata page required by an IO processing thread to implementing the IO operation is not contained in IO thread metadata resources;
   instructing a MetaData Page (MDP) thread, by the metadata page prefetch thread, to page-in the required metadata page to the IO thread metadata resources;
   after implementing the page-in process to load the metadata page to the IO thread metadata resources, selecting the IO operation from the IO queue by the IO processing thread to be implemented by the IO processing thread; and
   accessing the metadata page, by the IO processing thread, from the IO thread metadata resources in connection with implementing the IO operation by the IO processing thread;
   wherein determining, by the metadata page prefetch thread, that the metadata page required by the IO processing thread to implementing the IO operation is not contained in IO thread metadata resources comprises reading a Logical Block Address (LBA) of the IO operation while the IO operation is contained in the IO queue, and querying the IO thread metadata resources for a metadata page including metadata for the LBA of the IO operation;
   wherein the IO processing thread, the MDP thread, and the metadata page prefetch thread are three separate, asynchronous, and independent processing threads; and
   wherein the MDP thread executes to move metadata pages to the IO thread metadata resources in response to instructions from the IO processing thread and in response to instructions from the metadata page prefetch thread.

2. The method of claim 1, wherein querying the IO thread metadata resources for the metadata page comprises querying the IO thread metadata resources for all metadata pages required by the IO processing thread to implement the IO operation.

3. The method of claim 1, further comprising paging-in the required metadata page by the MDP thread from metadata storage to the IO thread metadata resources.

4. The method of claim 3, wherein metadata storage is implemented using a persistent memory technology, and IO thread metadata resources is implemented using a dynamic memory technology that has a shorter response time than the persistent memory technology.

5. The method of claim 1, further comprising:
after implementing the page-in process, accessing the metadata page by the metadata page prefetch thread, from the IO thread metadata resources, to identify subsequent metadata pages required by the IO processing thread in connection with implementing the IO operation, and
instructing the MDP thread, by the metadata page prefetch thread, to page-in the subsequent metadata pages to the IO thread metadata resources.

6. A storage system, comprising:
one or more processors and one or more storage devices storing instructions that are operable, when executed by the one or more processors, to cause the one or more processors to perform operations comprising:
receiving an IO operation;
placing the IO operation in an IO queue;
determining, by a metadata page prefetch thread, that a metadata page required by an IO processing thread to implementing the IO operation is not contained in IO thread metadata resources;
instructing a MetaData Page (MDP) thread, by the metadata page prefetch thread, to page-in the required metadata page to the IO thread metadata resources;
after implementing the page-in process to load the metadata page to the IO thread metadata resources, selecting the IO operation from the IO queue by the IO processing thread to be implemented by the IO processing thread; and
accessing the metadata page, by the IO processing thread, from the IO thread metadata resources in connection with implementing the IO operation by the IO processing thread;
wherein determining, by the metadata page prefetch thread, that the metadata page required by the IO processing thread to implementing the IO operation is not contained in IO thread metadata resources comprises reading a Logical Block Address (LBA) of the IO operation while the IO operation is contained in the IO queue, and querying the IO thread metadata resources for a metadata page including metadata for the LBA of the IO operation;
wherein the IO processing thread, the MDP thread, and the metadata page prefetch thread are three separate, asynchronous, and independent processing threads; and
wherein the MDP thread executes to move metadata pages to the IO thread metadata resources in response to instructions from the IO processing thread and in response to instructions from the metadata page prefetch thread.

7. The storage system of claim 6, wherein querying the IO thread metadata resources for the metadata page comprises querying the IO thread metadata resources for all metadata pages required by the IO processing thread to implement the IO operation.

8. The storage system of claim 6, further comprising paging-in the required metadata page by the MDP thread from metadata storage to the IO thread metadata resources.

9. The storage system of claim 8, wherein metadata storage is implemented using a persistent memory technology, and IO thread metadata resources is implemented using a dynamic memory technology that has a shorter response time than the persistent memory technology.

10. The storage system of claim 6, wherein the operations further include:
after implementing the page-in process, accessing the metadata page by the metadata page prefetch thread, from the IO thread metadata resources, to identify subsequent metadata pages required by the IO processing thread in connection with implementing the IO operation; and
instructing the MDP thread, by the metadata page prefetch thread, to page-in the subsequent metadata pages to the IO thread metadata resources.

* * * * *